US006903051B2

(12) United States Patent
Tao et al.

(10) Patent No.: US 6,903,051 B2
(45) Date of Patent: Jun. 7, 2005

(54) IN SITU THETA ALUMINA COATED MONOLITHIC CATALYST SUPPORTS

(75) Inventors: Tinghong Tao, Big Flats, NY (US); Jennifer M. Torns, Painted Post, NY (US); Brian P. Usiak, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 411 days.

(21) Appl. No.: 10/121,482

(22) Filed: Apr. 12, 2002

(65) Prior Publication Data

US 2004/0072689 A1 Apr. 15, 2004

(51) Int. Cl.[7] .............................. B01J 21/04; B01J 23/02; B01J 20/00; B01J 23/00
(52) U.S. Cl. .................. 502/527.19; 502/355; 502/415; 502/439; 502/527.11; 502/527.18
(58) Field of Search ................................ 502/355, 415, 502/439, 527.11, 527.18, 527.19

(56) References Cited

U.S. PATENT DOCUMENTS

| 3,554,929 | A |   | 1/1971  | Aarons |
|-----------|---|---|---------|--------|
| 4,039,482 | A |   | 8/1977  | Hoyer et al. |
| 4,208,454 | A |   | 6/1980  | Reed et al. |
| 4,231,900 | A |   | 11/1980 | Kato et al. |
| 4,277,376 | A |   | 7/1981  | Paolasini |
| 4,505,866 | A |   | 3/1985  | Oguri et al. |
| 4,528,279 | A |   | 7/1985  | Suzuki et al. |
| 4,529,718 | A |   | 7/1985  | Dupin |
| 4,550,034 | A |   | 10/1985 | Shimrock et al. |
| 4,568,572 | A |   | 2/1986  | Lee et al. |
| 4,619,909 | A |   | 10/1986 | Ono et al. |
| 4,708,946 | A |   | 11/1987 | Ohata et al. |
| 4,800,187 | A |   | 1/1989  | Lachman et al. |
| 4,957,896 | A |   | 9/1990  | Matsumoto et al. |
| 5,196,390 | A |   | 3/1993  | Tauster et al. |
| 5,260,249 | A |   | 11/1993 | Shiraishi et al. |
| 5,310,714 | A |   | 5/1994  | Grasselli et al. |
| 5,395,600 | A |   | 3/1995  | Cornelison |
| 5,439,865 | A | * | 8/1995  | Abe et al. .................... 502/333 |
| 5,632,961 | A |   | 5/1997  | Sheller |
| 5,723,403 | A | * | 3/1998  | Durand et al. .............. 502/304 |
| 5,997,830 | A |   | 12/1999 | Itohe et al. |
| 6,087,298 | A |   | 7/2000  | Sung et al. |
| 6,123,912 | A | * | 9/2000  | Wei et al. ................... 423/625 |
| 6,149,877 | A |   | 11/2000 | Ogai |
| 6,248,684 | B1 |  | 6/2001  | Yavuz et al. |
| 6,287,527 | B1 | * | 9/2001  | Kawanami et al. ...... 423/213.2 |
| 6,462,244 | B1 | * | 10/2002 | Huang et al. ............... 585/269 |

FOREIGN PATENT DOCUMENTS

EP  0 625 371  7/1998

* cited by examiner

Primary Examiner—Cam N. Nguyen
(74) Attorney, Agent, or Firm—Anca C. Gheorghiu

(57) ABSTRACT

The invention provides a monolithic catalyst support for hydrogenation and hydrotreating and in particular for selective hydrogenation of pyrolysis gasoline. The monolithic catalyst includes (i) a multicellular monolith body, preferably having a honeycomb structure, most preferably a honeycomb structure made of cordierite, the honeycomb structure having an inlet end, an outlet end, and a multiplicity of mutually adjoining cells extending along the length of the body from the inlet end to the outlet end, the cells being separated from one another by porous walls, and, (ii) a coating consisting of theta alumina synthesized in situ on the multicellular monolith body. The in situ theta alumina is strongly bonded with the multicellular monolith body and comprises at least 50% by weight of the washcoat layer, and preferably greater than 90% by weight.

16 Claims, No Drawings

IN SITU THETA ALUMINA COATED MONOLITHIC CATALYST SUPPORTS

BACKGROUND OF INVENTION

The invention relates to monolithic catalyst support structures formed of alumina, and particularly to theta-alumina coated monolith supports for catalytic reactions involving hydrogenation including pyrolysis gasoline hydrogenation and hydrotreating.

In a hydrocarbon process such as pyrolysis gasoline hydrogenation for the removal of olefinic impurities from gasoline, theta alumina phase is desirable due to its low surface acidity and reduced tendency to form coke with olefinic impurities. It is particularly effective for selective hydrogenation such as di-olefine hydrogenation, Cat-Naphtha hydrogenation to preserve its octane number, acetylene hydrogenation into ethylene, removal of olefines from aromatics, etc. as some examples but not limited to these listed examples.

Despite the numerous benefits of theta alumina, there are limited commercial resources available for these products. This is especially true for monolithic catalyst supports comprising high percentage of alumina in theta crystalline phase. Catalyst supports having a coating of theta alumina generated in-situ are more effective when compared to catalyst supports having a washcoated theta alumina layer. By "in situ theta alumina" is meant theta alumina formed or synthesized from alumina precursors on site.

Consequently, the coating of ceramic monoliths with a film or washcoat of alumina is relatively easy and has been practiced in automotive catalyst industry for many years. There are many patents covering the detailed coating compositions and their processing. The following offers a brief summary of the prior art.

U.S. Pat. Nos. 3,554,929, 4,039,482, 4,208,454, and 4,550,034 disclose techniques of washcoating substrates or supports including alumina material washcoating. However, the referenced patents do not teach in situ synthesized theta alumina formed as the main phase in the coating of the monolithic support body, i.e., over 50% by weight of the composition.

U.S. Pat. No. 4,529,718 discloses a washcoated monolith structure with alumina or its precursor materials in aqueous slurry or solution to form a catalyst support. Based on this disclosure, the washcoated alumina layer formed on the monolith substrate is mainly composed of gamma-phase crystallites with some minor phases (less than 5–10% by weight) of alpha, theta, and delta phases. However, this patent does not teach a monolithic support with an in situ synthesized theta alumina coating for use as a catalyst support.

A need exists for in situ synthesized theta alumina monolithic catalyst supports which can be efficiently manufactured to meet the performance and stability requirements for hydrogenation and hydrotreating applications. The present invention provides such structured materials and methods.

SUMMARY OF INVENTION

The invention provides a monolithic catalyst support for hydrogenation and hydrotreating and in particular for selective hydrogenation of pyrolysis gasoline. The monolithic catalyst includes (i) a multicellular monolith body, preferably a honeycomb structure, and more preferably a honeycomb structure made of cordierite, the honeycomb structure having an inlet end, an outlet end, and a multiplicity of mutually adjoining cells extending along the length of the body from the inlet end to the outlet end, the cells being separated from one another by porous walls, and, (ii) a coating consisting of theta alumina synthesized in situ on the multicellular monolith body. The in situ synthesized theta alumina is strongly bonded with the multicellular monolith body and comprises at least 50% by weight of the coating layer, and preferably greater than 90% by weight.

Another aspect of the invention is a method of producing a theta alumina monolith catalyst support, the method involving: (i) providing a multicellular monolith body, preferably a honeycomb structure; (ii) applying a washcoat of alumina-producing precursors such as an aluminum oxide hydroxide ($AlOOH \cdot xH_2O$), aluminum hydroxide, aluminum nitrate, organic salts of aluminum including aluminum isopropoxide, lactate, triethoxide, and the like, to the honeycomb structure; (iii) drying, and then (iv) calcining to form in situ synthesized theta alumina being greater than 50% by weight, preferably greater than 90% by weight in the coating layer composition. Preferably, the calcining process is carried out at a temperature range of between about 800° to 1200° C. with a hold of at least 0.5 hour, preferably between about 900° to 1050° C. with a hold of at least 2–4 hours, and most preferably at 1000° C. with a hold of 3 hours.

The inventive monolithic supports are suitable for a variety of catalysts including noble metals and compounds, transitional metals and compounds, alkali oxides and compounds, and alkali earth oxides and compounds, rare earth oxides and compounds, being particularly suitable for platinum (Pt), palladium (Pd), and nickel (Ni) and the combinations thereof.

DETAILED DESCRIPTION

The monolithic catalyst supports of the present invention comprise a multicellular substrate body, preferably a honeycomb structure. The honeycomb has an inlet end, an outlet end, and a multiplicity of mutually adjoining cells extending along the length of the body from the inlet end to the outlet end. The cells are separated from one another by porous walls. Typically, honeycomb cell densities range from 10 cells/in$^2$ (1.5 cells/cm$^2$) to 1200 cells/in$^2$ (188 cells/cm$^2$). Wall thickness is typically 0.025 to 1.5 mm (1 to 60 mils), and preferably 0.1 to 0.75 mm (4 to 30 mils). Wall pore size is typically about 0.1 to 100 micrometers, preferably about 1 to 40 micrometers, and wall porosity is about 15–70%, preferably about 25–50%.

Suitable honeycomb bodies are composed of substantially a cordierite oxide phase close to that of $Mg_2Al_4Si_5O_{18}$; however, limited substitution of other constituents such as Fe (iron), Co (cobalt), Ni (nickel), and Mn (manganese) for the Mg (magnesium), Ga (gallium) for the Al (aluminum), and Ge (germanium) for the Si (silicon) is acceptable. Also, the cordierite phase may contain up to three atoms of an alkali (Group IA) metal, two atoms of an alkaline earth metal (Group IIA), or one atom of a rare earth metal (scandium, yttrium, or a lanthanide metal) per 54 oxygens. These substituents would be expected to occupy the normally vacant "channel sites" in the crystal structure of the cordierite phase, although their limited substitution for Mg might also occur. Incorporation of these elements into the cordierite crystal structure may be coupled with other chemical substitutions, such as a change in Al/Si ratio, to preserve charge balance.

Multicellular bodies made of materials other than cordierite can also be used in the present invention. These materials include ceramic, glass, metal, clays, and the combination thereof. By the combinations is meant physical or chemical combinations, e.g., mixtures, compounds, or composites.

The invention is practiced by washcoating a slurry containing a precursor material onto the substrate body, and then generating in situ theta alumina as a thin film or coating onto the substrate. Suitable precursors are inorganic and organic salts of alumina-producing compounds or materials and their derivatives including aluminum oxide hydroxide (AlOOH.xH$_2$O), aluminum hydroxide, aluminum nitrate, organic salts of aluminum including aluminum isopropoxide, lactate, triethoxide, etc. Washcoating techniques involve forming a slurry of these precursor materials with various binders, and then contacting the slurry with the substrate.

The preferred precursor material is an aluminum oxide hydroxide, AlOOH.xH$_2$O, commonly referred to as boehmite or aluminum monohydrate. Suitable binders include colloidal alumina (which is meant to include those materials which when fired form alumina) modified with organic acids to improve slurry processing performance in terms of coatability, adhesion, and also rheology of the slurry. The organic acids include, but are not limited to, acetic acid, oxalic acid, and maleic acid.

The washcoating slurry has a viscosity of 2–50 centipoise and preferably 10–15 centipoise. The average particle size of the precursor material is 0.1 to 50 micrometers and preferably 2–5 micrometers in diameter. The weight ratio of the precursor material:binder:water in the slurry is about 36%:75%:56%, and preferably 47%:3%:50%. The contacting can be done any number of times to achieve the desired loading. The amount of washcoat on the substrate is between about 2 to 55 wt. %, more typically between about 20 to 40 wt. %, and most preferably about 30 wt. %, based on the total weight of substrate and coating.

The resulting washcoated substrate body is dried using a programmed schedule at 40–120° C. temperature range with samples under constant motion and dynamic air flow through each channel uniformly. For example, one of approach drying at 85° C. for at least about for 0.5 hour, preferably for 1 hour, raising the temperature to 120° C. and maintaining thereat for at least 0.5 hours, preferably for 2 hours, while rolling the sample constantly and guiding warm air directly into the channels uniformly.

To obtain the theta phase from a boehmite alumina precursor, the prior art dictates a peak firing temperature of 1100° C. The equation below provides a typical phase transformation as a function of heat treatment for a boehmite alumina precursor, wherein the symbol γ represents the gamma phase; the symbol θ represents the theta phase; the symbol δ represents delta phase; the symbol α represents the alpha phase.

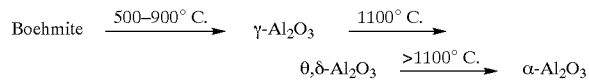

In the present invention, however, it has been found that the theta phase crystallite was induced from the boehmite alumina precursor at the cordierite crystal structure through its surface interaction at a lower peak firing temperature. Specifically transformation to the theta phase started at 800° C. with a complete conversion to over 90% theta alumina at 1000° C. It is believed that crystalline cordierite crystals in the monolithic substrate serve as nucleation seeds for growth and alignment of the theta alumina phase. This unexpected result will have an impact on the manufacturing costs which will be correspondingly reduced. Accordingly, the calcination conditions for washcoated substrates according to the present invention are carried out at a temperature range of between about 800° to 1200° C. with a hold of at least 0.5 hour, preferably between about 900° to 1050° C. with a hold of at least 2–4 hours, and most preferably at 1000° C. with a hold of 3 hours.

The monolithic catalyst supports of the present invention comprising an in situ synthesized a theta alumina coating offer several advantages over prior are washcoated counterparts. The key differences between these types of catalyst supports are their catalytic supporting activity. The in situ synthesized theta alumina outperforms the washcoated supports primarily because its crystalline plate orientation aligns with the cordierite structure. Further, the in situ synthesized theta alumina coating offers better adhesion strength with the substrate body as a result of the strong contact therebetween.

The invention may be further understood by reference to the following examples, which are intended to be illustrated rather than limiting.

COMPARATIVE EXAMPLE 1

A granular catalyst support was prepared from Alcoa® G-250 boehmite (available from Alcoa, Pittsburgh, Pa.), which was first milled to a powder having a mean particle size of 2–5 micrometers, and then heat treated at temperatures of 400° C.–1200° C. in static air. The resulting phase structure as a function of temperature was identified via standard X-Ray Diffraction (XRD) Techniques. As expected the boehmite powder converted to the gamma alumina phase at a temperature between 500° C. and 600° C. As the temperature continued to increase to 900° C., gamma alumina partially converted to theta alumina and this conversion continued to completion at 1100° C. Further increases in temperature resulted in alpha alumina formation.

COMPARATIVE EXAMPLE 2

A granular catalyst support was prepared from LaRoche® GH-22 gamma alumina (available from UOP, Baton Rouge, La.) which was first milled to a powder having a mean particle size of 2–5 micrometers, and then heat treated to temperatures of 400° C.–1200° C. in static air. The resulting phase structure as a function of temperature was determined as above. There was no formation of a theta-alumina phase during the heat treatment. Instead gamma alumina converted into delta alumina and alpha alumina starting at about 1000° C. until complete conversion to alpha alumina at 1200° C.

COMPARATIVE EXAMPLE 3

A granular catalyst support was prepared from Conde Vista Puralox® SCCa 30/90 theta alumina (available from Condea Chemie GmbH, Westlake, La.), which was first milled to a powder having a mean particle size of 2–5 micrometers, and then heat treated at temperatures of 400° C.–1200° C. in static air. The resulting phase structure as a function of temperature was determined as above. The theta alumina converted to alpha at 1000° C.

From a study of the three comparative example above it is evident that the starting alumina precursor is an important step in the process of the invention since the final phase formation strongly depends upon the precursor and its source/impurities and their interaction with crystal structure of cordierite body.

COMPARATIVE EXAMPLE 4

A slurry was prepared by mixing Alcoa® G-250 boehmite powder with the appropriate amount of water and binders to form a slurry. Specific components of the slurry were 46.68 wt. % of Alcoa® G-250 boehmite alumina, 2.46 wt. % of a commercial Nyacol AL-20 colloidal solution, 0.49 wt. % of Fisher glacial acetic acid, and 50.37 wt. % water. The pH of the slurry was adjusted to 3.50–3.75 with nitric acid. The slurry was dried at 120° C. for 2 hours, followed by firing in air at 300° C./hr from 600° C.–1200° C. with a hold at each temperature for 3 hours.

The phase assemblage was analyzed at 1000° C. and 1100° C. via XRD, as before. Alpha alumina instead of theta alumina was detected at 1000° C., similar to comparative example 3. Theta alumina was not observed following firing over a temperature range of 700 to 1100° C.

INVENTIVE EXAMPLE 1

A monolithic catalyst support was prepared as follows. Alcoa® G-250 boehmite powder was mixed with the appropriate amount of water and binders to form a slurry. Specific components of the slurry were 46.68 wt. % of Alcoa® G-250 boehmite alumina, 2.46 wt. % of a commercial Nyacol AL-20 colloidal solution, 0.49 wt. % of Fisher glacial acetic acid, and 50.37 wt. % water. The pH of the slurry was adjusted to 3.50–3.75 with nitric acid. A 2 cm diameter by 15.2 cm height cordierite honeycomb sample having 62 cells/cm$^2$ (400 cells/in$^2$) with a 0.177 mm (7 mil) thickness was dipped into the slurry. The dipping process was repeated to allow a pick-up of about 30% by weight (based on the total weight of the substrate and coating). The final washcoated honeycomb was dried while rolling the honeycomb about its axis at 85° C. for 1 hour and then at 120° C. for 2 hours, followed by firing in air at 300° C./hr from 600° C. to 1200° C. with a hold at each temperature for 3 hours. During the heat treatment the boehmite is synthesized to form theta alumina in situ.

The phase assemblage was analyzed at 1000° C. and 1100° C. via XRD, as before. There was complete conversion to theta alumina at 1000° C., and did not require treatment to 1100° C., as did the granular support in comparative example 1. This unexpected result is believed, although not intending to be bound by this theory, to have occurred as a result of the interaction at the interface between the surface of cordierite substrate and the slurry during the subsequent heat treatment. It is postulated that cordierite crystalline structure serves as crystal nucleation seeds to induce the formation of the theta phase upon heat treatment. Accordingly, theta alumina was synthesized or formed in situ at the interface with the surface of the on the cordierite honeycomb monolith body.

It is envisioned that any crystal structure similar to that of cordierite, such as an orthorhombic phase structure, can be used as a nucleation seed for inception of theta phase formation on the surface of or in the body of monolithic substrate body. Furthermore, nucleation or structure-forming seeds having an orthorhombic or similar crystal structure to cordierite can be added directly into the washcoating slurry of alumina producing precursors or onto the surface or body of monolithic structure when cordierite or similar structures are not available. Cordierite is the preferred choice due to its cost and process advantages.

While the present invention has been described in detail with respect to certain illustrative and specific embodiments thereof, it should not be considered limited to such but may be used in other ways without departing from the spirit of the invention and the scope of the following claims.

What is claimed:

1. A monolithic catalyst support comprising a multicellular monolith body and a coating layer of in situ synthesized theta alumina strongly bonded to the multicellular monolith body, wherein the theta alumina is greater than 50% by weight of the coating layer.

2. A monolithic catalyst support according to claim 1 wherein the theta alumina is greater than 90% by weight of the coating layer.

3. A monolithic catalyst support according to claim 2 wherein the multicellular monolith body is composed of a material selected from the group consisting of ceramic, glass, glass-ceramic, metal and combinations thereof.

4. A monolithic catalyst support according to claim 3 wherein the multicellular monolith body is a honeycomb structure.

5. A monolithic catalyst support according to claim 4 wherein the honeycomb structure has an inlet end, an outlet end, and a multiplicity of mutually adjoining cells extending along the length of the honeycomb structure from the inlet end to the outlet end, the cells being separated by from one another by porous walls.

6. A monolithic catalyst support according to claim 5 wherein the honeycomb structure is composed of cordierite.

7. A monolithic catalyst support according to claim 6 wherein the honeycomb structure is further characterized by:
   a cell density of 10 to 1200 cells per square inch;
   a cell wall thickness of 0.1 to 50 mil;
   a cell wall porosity of 10% to 75% by volume; and,
   a cell wall median pore size of 1 to 50 micrometers.

8. A monolithic catalyst support according to claim 7 wherein the honeycomb structure is further characterized by:
   a cell density of 100 to 600 cells per square inch;
   a cell wall thickness of 2 to 35 mil;
   a cell wall porosity of 25% to 65% by volume; and,
   a cell wall median pore size of 10 to 35 micrometers.

9. A method of producing an in situ synthesized theta alumina monolith catalyst support, the method comprising:
   a. providing a multicellular monolith body;
   b. applying a washcoat of an alumina precursor to the multicellular monolith body;
   c. drying the resulting coated multicellular monolith body; and,
   d. calcining the dried coated multicellular monolith body at a temperature of 800° to 1200° C. for at least 0.5 hours to in situ synthesize and strongly bond theta alumina in a proportion greater than 50% by weight of the calcined coating to the multicellular monolith body.

10. The method of claim 9 wherein the calcining step is carried out at a temperature of between 900° to 1050° C. for 2 to 4 hours to in situ synthesize and strongly bond theta alumina in a proportion greater than 90% by weight of the calcined coating to the multicellular monolith body.

11. The method of claim 10 wherein the calcining step is carried out at a temperature of 1000° C. for 3 hours.

12. The method of claim 9 wherein the multicellular monolith body is a honeycomb structure.

13. The method of claim 12 wherein the honeycomb structure is characterized by an inlet end, an outlet end, and a multiplicity of mutually adjoining cells extending along the length of the honeycomb structure from the inlet end to the outlet end, the cells being separated by from one another by porous walls.

14. The method of claim 13 wherein the alumina precursor is selected from the group consisting of inorganic and organic salts of aluminum.

15. The method of claim 14 wherein the alumina precursor is selected from the group consisting of aluminum oxide hydroxide (AlOOH.xH2O), aluminum hydroxide, aluminum nitrate, aluminum isopropoxide, lactate, and triethoxide.

16. The method of claim 15 wherein the alumina precursor is aluminum oxide hydroxide or boehmite.

* * * * *